UNITED STATES PATENT OFFICE.

JUNIUS SCHENCK, OF BROOKLYN, NEW YORK.

IMPROVEMENT IN THE MANUFACTURE OF HOSE, TUBING, AND OTHER RUBBER FABRICS.

Specification forming part of Letters Patent No. 90,397, dated May 25, 1869; Reissue No. 3,842, dated February 15, 1870.

*To all whom it may concern:*

Be it known that I, JUNIUS SCHENCK, of Brooklyn, in the county of Kings and State of New York, have invented certain new and useful Improvements in Preventing Decay in Rubber Hose, Tubing, Belting, and the Like; and I hereby declare that the following is a full, clear, and exact description of the same.

To enable others to make and use my invention, I will describe it.

It has long been known that rubber hose, after a few years' service, becomes very much weakened, especially near the joints. This has been attributed to various causes. After repeated and long-continued experiments, I have ascertained that it is due to rot or decay in the fibrous materials which compose the body of the hose.

The object of my invention is to prevent this decay by a simple, cheap, and effective process.

It has often been proposed to prevent decay in canvas, duck, and similar fabrics by saturating them with solutions of mineral salts, such as chloride of zinc, sulphate of copper, corrosive sublimate, and the like. The chloride of zinc will not answer, for the reason that it corrodes and destroys the fabrics; so, also, of the sulphate of copper, unless used with great care. The corrosive sublimate is a very unstable salt in the presence of moisture and organic matters, and therefore its preservative action is only temporary. It has also been proposed to use mineral tar, pitch, resin, and bituminous matters to saturate or coat the cloth; but these, while they contain some elements which are good preservatives of cloth, contain others which are destructive of the cloth, and as much injury as benefit is produced in the hose.

My invention is free from all these objections, and consists in impregnating the fabric to be used in the manufacture of rubber or "combination hose" with carbolic acid, or any of its related series of compounds, and manufacturing the hose from such fabric by the modes and processes now in use.

I take a solution of carbolic acid, more or less pure, according to the kind of hose to be manufactured, and form a solution of about one part of the acid to one hundred and fifty parts of water; but other proportions may be used. In the solution I immerse the duck, canvas, or other fibrous material to be used in forming the hose.

Any other known mode may be employed to impregnate the fabric, since the mode of applying the carbolic acid to a fabric constitutes no part of my invention.

The hose may be conveniently manufactured according to the process described in the patent of William A. Torrey, July 10, 1866, No. 56,292, or by any of the modes heretofore in use.

My invention is also applicable to the manufacture of belting, packing, and other fabrics where rubber and fibrous materials are combined.

I do not claim the application of chloride of zinc, corrosive sublimate, pyrolignite of iron, oil of tar, or other bituminous, pitchy, or resinous matters, as these have been used on paper, wood, and cloth both with and without rubber. The resinous and bituminous matters prevent an intimate union of the duck and layers of india-rubber when applied to hose. The metallic salts, as is above mentioned, injure the duck or other fabric to which they are applied; but, Having fully described my invention, what I claim, and desire to secure by Letters Patent, is—

1. The application of carbolic acid in the manufacture of hose, belting, tubing, and packing, and other fabrics, so as to preserve them from decay, substantially as herein set forth and described.

2. The improved hose, belting, tubing, and packing herein described, prepared by using duck or other fabric impregnated with carbolic acid, or its equivalent, substantially as herein set forth.

JUNIUS SCHENCK.

Witnesses:

W. G. HENDERSON,

B. S. HEDRICK.